United States Patent
Peng et al.

(10) Patent No.: US 12,348,162 B2
(45) Date of Patent: Jul. 1, 2025

(54) POWER TRANSFER FOR ELECTRIC MOTORS WITH SEGMENTED WINDINGS

(71) Applicant: GM GLOBAL TECHNOLOGY OPERATIONS LLC, Detroit, MI (US)

(72) Inventors: Peng Peng, Columbus, OH (US); Lei Hao, Troy, MI (US); Suresh Gopalakrishnan, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 146 days.

(21) Appl. No.: 18/355,717

(22) Filed: Jul. 20, 2023

(65) Prior Publication Data
US 2025/0030362 A1    Jan. 23, 2025

(51) Int. Cl.
*H02P 25/22* (2006.01)
*H02P 21/14* (2016.01)
*H02P 27/08* (2006.01)

(52) U.S. Cl.
CPC ............ *H02P 21/14* (2013.01); *H02P 27/085* (2013.01); *H02P 2207/05* (2013.01)

(58) Field of Classification Search
CPC ..... H02P 27/085; H02P 21/14; H02P 2207/05
USPC .................................................. 318/400.02
See application file for complete search history.

(56) References Cited

U.S. PATENT DOCUMENTS

| | | | | |
|---|---|---|---|---|
| 5,502,360 | A * | 3/1996 | Kerkman | H02P 21/16 318/811 |
| 11,303,238 | B2 * | 4/2022 | Takahashi | H02P 21/22 |
| 11,533,009 | B2 * | 12/2022 | Takahashi | H02P 21/0089 |
| 2006/0192510 | A1 * | 8/2006 | Okazaki | B60L 15/2045 318/139 |
| 2012/0033472 | A1 * | 2/2012 | Oka | H02P 21/22 318/521 |
| 2014/0375236 | A1 * | 12/2014 | Kim | H02P 6/08 318/400.04 |
| 2019/0165702 | A1 * | 5/2019 | Chretien | H02P 5/74 |
| 2019/0229664 | A1 * | 7/2019 | Kobayashi | H02P 21/22 |

\* cited by examiner

*Primary Examiner* — Gabriel Agared
(74) *Attorney, Agent, or Firm* — CANTOR COLBURN LLP (57) ABSTRACT

Power transfer in an electric motors including segmented windings utilize control commands. A control system determines a d-axis command voltage for a secondary winding of an electric motor and a q-axis command voltage for the secondary winding based on a primary winding voltage, primary winding current, secondary winding current, and rotor electrical position. The control system generates gate control signals based on the determined d-axis command voltage and q-axis command voltage for the secondary winding and transmits the gate control signals to an inverter coupled to the secondary winding to control an electrical power transfer between the primary winding and the secondary winding.

20 Claims, 10 Drawing Sheets

POWER TRANSFER FOR ELECTRIC MOTORS WITH SEGMENTED WINDINGS

INTRODUCTION

The subject disclosure relates to electric motors. In particular, embodiments of the present disclosure relate to power transfer in electric motors having segmented windings.

Electric motors can generally be described as having a stator and a rotor. The stator is fixed in place and the rotor operates relative to the stator. In electric motors, the stator is typically a current-carrying component of an electric motor, which generates a magnetic field that interacts with the rotor. The rotor of the electric motor includes a magnetic rotor and the magnetic field generated by the stator is controlled to rotate the rotor.

The stator of an electric motor typically includes a series of steel laminations, which are stacked together and contain slots to hold copper wire windings. These windings are used to create a magnetic field that interacts with the magnetic field of the rotor to produce torque. The windings in the stator can be arranged in different ways depending on the specific type of motor. The most common arrangement is a three-phase winding, which consists of three sets of windings that are spaced 120 degrees apart around the stator. Each set of windings is connected to a different phase of the power supply, which creates a rotating magnetic field when the motor is energized. In a three-phase motor, the windings are typically made up of coils of insulated copper wire. The number of turns in each coil, as well as the thickness of the wire, will depend on the specific motor design and the desired operating characteristics.

The windings in the stator are responsible for creating the magnetic field that interacts with the rotor to produce torque. When the motor is energized, the magnetic field in the stator begins to rotate, which causes the rotor to turn as well. The speed of the motor is determined by the frequency of the power supply and the number of poles in the stator winding.

Electric motors in propulsion mode typically use closed-loop current control to adjust torque and speed. The windings are energized with controllable energy/power sources, such as by using a battery and a voltage source inverter (VSI) with pulse width modulation (PWM) control.

Electric motors, particularly in vehicles, may be used in direct-grid-tie alternating current (AC) power transfer applications, for example where the power source of the vehicle (e.g., a battery) is charged from an electrical grid or the power source is used to supply power to a system outside the vehicle. Such applications may be referred to as grid-to-vehicle (G2V), vehicle-to-grid (V2G), vehicle-to-load (V2L), or vehicle-to-house (V2H) charging. Such direct-grid-tie applications, typically utilize a segmented-winding electric machine, where a primary winding (winding 1) is coupled to an external energy/power source and a secondary winding (winding 2) is coupled to an onboard controllable energy/power source. Among other things, embodiments of the present invention help provide control over the magnitude and direction of power flow between the primary and secondary winding.

SUMMARY

In one exemplary embodiment, a control system for an electric motor is provided. The control system comprises a processor and memory coupled to the processor. The memory stores instructions that, when executed by the processor, cause the control system to: receive a voltage and a current from a primary winding of the electric motor; receive a current from a secondary winding of the electric motor; receive a rotor electrical position from a rotor of the electric motor; determine a d-axis command voltage for the secondary winding and a q-axis command voltage for the secondary winding based on the primary winding voltage, the primary winding current, the secondary winding current, and the rotor electrical position; generate gate control signals based on the determined d-axis command voltage and q-axis command voltage for the secondary winding; and transmit the gate control signals to an inverter coupled to the secondary winding to control an electrical power transfer between the primary winding and the secondary winding.

In addition to one or more of the features described herein, the voltage from the primary winding is a three-phase voltage, the current from the primary winding is a three-phase current, and the current from the secondary winding is a three-phase current.

In addition to one or more of the features described herein, the electric motor comprises a segmented-winding machine.

In addition to one or more of the features described herein, the segmented winding machine is a permanent magnet synchronous machine, a synchronous reluctance machine, or a wound field synchronous machine.

In addition to one or more of the features described herein, the segmented winding machine comprises the secondary winding coupled to a rechargeable energy storage system and the primary winding coupled to an external power source.

In addition to one or more of the features described herein, the d-axis command voltage is associated with a d-axis along a direction of a north polarity of a magnet or a north polarity of a magnet field generated by a rotor field winding.

In addition to one or more of the features described herein, the d-axis command voltage is associated with reactive power transfer of the electric motor.

In addition to one or more of the features described herein, the q-axis command voltage is associated with a q-axis that is perpendicular to the d-axis, wherein the q-axis is ninety degrees ahead of the north polarity associated with the d-axis.

In addition to one or more of the features described herein, the q-axis command voltage is associated with active power transfer in the electric motor.

In addition to one or more of the features described herein, wherein determining the d-axis command voltage for the secondary winding and the q-axis command voltage for the secondary winding is further based on a d-axis leakage inductance and a q-axis leakage inductance measured from the electric motor.

In addition to one or more of the features described herein, the gate control signals are to turn the electric motor at a speed synchronous with a grid voltage associated with the electric motor.

In addition to one or more of the features described herein, the speed synchronous with the grid voltage is further based on a grid frequency and a number of magnetic poles associated with the electric motor.

In addition to one or more of the features described herein, the speed synchronous with the grid voltage is based on a determined amount of torque.

In addition to one or more of the features described herein, the electric motor has reluctance torque, and the d-axis command voltage is determined based on a d-axis current associated with the determined amount of torque.

In addition to one or more of the features described herein, the electric motor does not have reluctance torque, and the q-axis command voltage is determined based on a q-axis current associated with the determined amount of torque.

In addition to one or more of the features described herein, the d-axis command voltage for the secondary winding and a q-axis command voltage for the secondary winding are determined based on a desired torque to achieve a speed synchronous with the grid voltage associated with the electric motor.

In addition to one or more of the features described herein, the gate control signals are generated by applying a pulse width modulation (PWM) process to the determined d-axis command voltage and q-axis command voltage for the secondary winding.

In addition to one or more of the features described herein, the PWM process is a space vector pulse width modulation (SVPWM) process.

In one exemplary embodiment, an electric motor is provided. The electric motor comprises a rotor; a stator; a primary winding coupled to the stator; a secondary winding coupled to the stator; an inverter coupled to the primary winding; and a control system coupled to the rotor, primary winding, secondary winding, and inverter. The control system comprises a processor; and memory coupled to the processor and storing instructions that, when executed by the processor, cause the control system to: receive a voltage and a current from the primary winding of the electric motor; receive a current from the secondary winding of the electric motor; receive a rotor electrical position from the rotor of the electric motor; determine a d-axis command voltage for the secondary winding and a q-axis command voltage for the secondary winding based on the primary winding voltage, the primary winding current, the secondary winding current, and the rotor electrical position; generate gate control signals based on the determined d-axis command voltage and q-axis command voltage for the secondary winding; and transmit the gate control signals to the inverter coupled to the secondary winding to control an electrical power transfer between the primary winding and the secondary winding.

In one exemplary embodiment, a vehicle is provided. The vehicle comprises an electric motor that includes: a rotor; a stator; a primary winding coupled to the stator; a secondary winding coupled to the stator; an inverter coupled to the secondary winding; and a control system coupled to electric motor. The control system comprises a processor; and memory coupled to the processor and storing instructions that, when executed by the processor, cause the control system to: receive a voltage and a current from the primary winding of the electric motor; receive a current from the secondary winding of the electric motor; receive a rotor electrical position from the rotor of the electric motor; determine a d-axis command voltage for the secondary winding and a q-axis command voltage for the secondary winding based on the primary winding voltage, the primary winding current, the secondary winding current, and the rotor electrical position; generate gate control signals based on the determined d-axis command voltage and q-axis command voltage for the secondary winding; and transmit the gate control signals to the inverter coupled to the secondary winding to control an electrical power transfer between the primary winding and the secondary winding.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

The following description is merely exemplary in nature and is not intended to limit the present disclosure, its application or uses. It should be understood that throughout the drawings, corresponding reference numerals indicate like or corresponding parts and features.

In accordance with an exemplary embodiment, a control system for an electric motor is provided. The control system may determine d-axis and q-axis command voltages based on measured characteristics of the electric motor. The control system may use the d-axis and q-axis command voltages to generate gate control signals to control electrical power transfer between the primary and secondary windings of the electric motor. In this manner, embodiments of the present invention can aid in controlling the electric motor during bidirectional direct-grid-tied power transfer applications, such as V2G, G2V, V2H, V2L, and vehicle-to-vehicle (V2V) power transfers.

Figure 1:
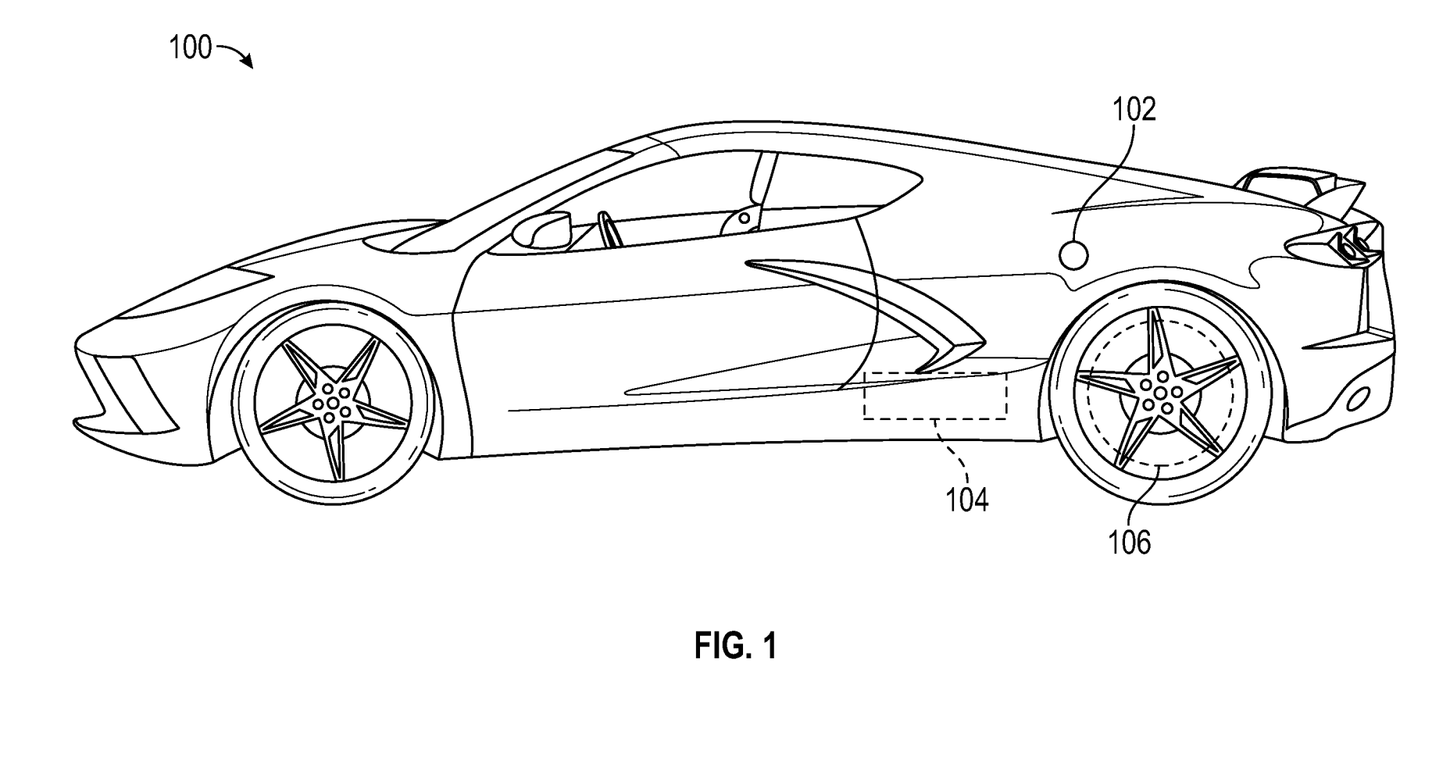
FIG. 1 is a schematic diagram of a vehicle for use in conjunction with one or more embodiments of the present disclosure.

Referring now to FIG. 1, a schematic diagram of a vehicle 100 for use in conjunction with one or more embodiments of the present disclosure is shown. The vehicle 100 includes a charging port 102, a battery 104, and an electric motor 106. In one embodiment, the vehicle 100 is a hybrid vehicle that utilizes both an internal combustion engine and an electric motor. In another embodiment, the vehicle 100 is an electric vehicle that only utilizes electric motors. In exemplary embodiments, the vehicle 100 is configured to be connected, via charging port 102, to a high-voltage power source (i.e., a voltage source of at least 200 volts (V)), which is used to charge the battery 104. The electric motor 106 is configured to receive power from the battery 104 to provide propulsion for the vehicle 100. In exemplary embodiments, the battery 104 is configured to supply direct-current (DC) power to an inverter (not shown), which converts the DC power into three-phase alternating-current (AC) power. The three-phase AC power is supplied to the electric motor 106 to propulsion for the vehicle 100.

Figure 2A:
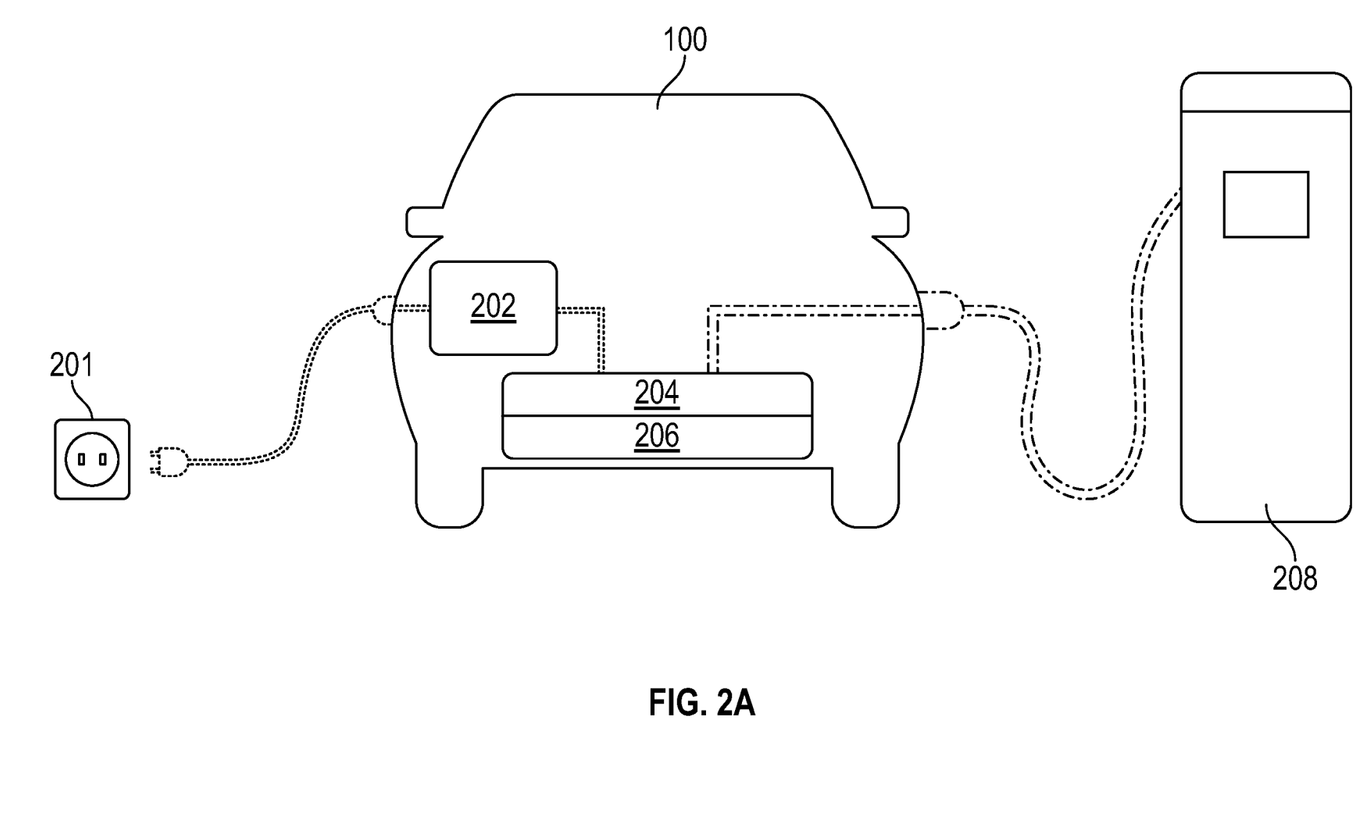
FIG. 2A is a schematic diagram showing two charging scenarios for an electric-powered vehicle in accordance with embodiments of the present disclosure.

Referring now to FIG. 2A, a schematic diagram showing two charging scenarios for an electric-powered vehicle are shown. In this example, in a first scenario the vehicle may be charged via an AC direct-grid connection from outlet 201 coupled to an on-board charging system 202. The on-board charging system is coupled to a battery management system (BMS) 204 that manages charging of the vehicle's battery (a lithium-ion battery in this example) 206. In a second scenario, a DC fast charging system 208 may charge the battery 206 via the BMS 204.

Figure 2B:
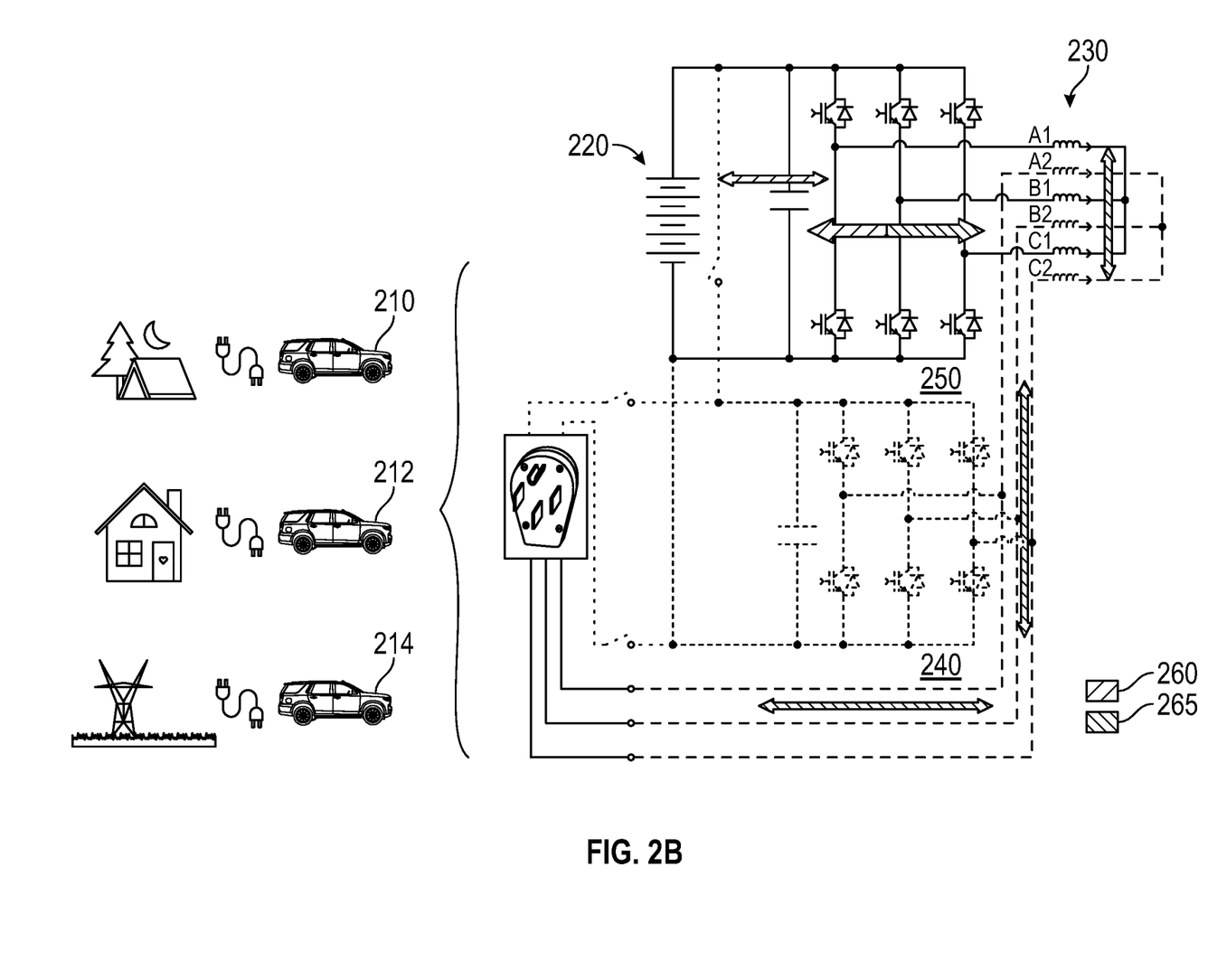
FIG. 2B is a schematic diagram illustrating various direct-grid connections with an electric-powered vehicle in accordance with embodiments of the present disclosure.

Referring now to FIG. 2B, a schematic diagram illustrating various direct-grid connections with an electric-powered vehicle are shown. In this example, the electric motor of a vehicle can be coupled to a direct-grid connection such as a V2L connection 210, V2H connection 212, or V2G connection 214 through integrated inverter system 240. The electric motor of the vehicle further comprises a segmented-winding machine 230 comprising windings A1, A2, B1, B2, C1, and C2. The segmented winding machine 230 is coupled to battery 220 via a second integrated inverter system 250, as well as to the first integrated inverter system 240. In this example, DC power transfer is indicated with shaded arrows 260, while AC power transfer is indicated with shaded arrows 265.

Figure 3A:
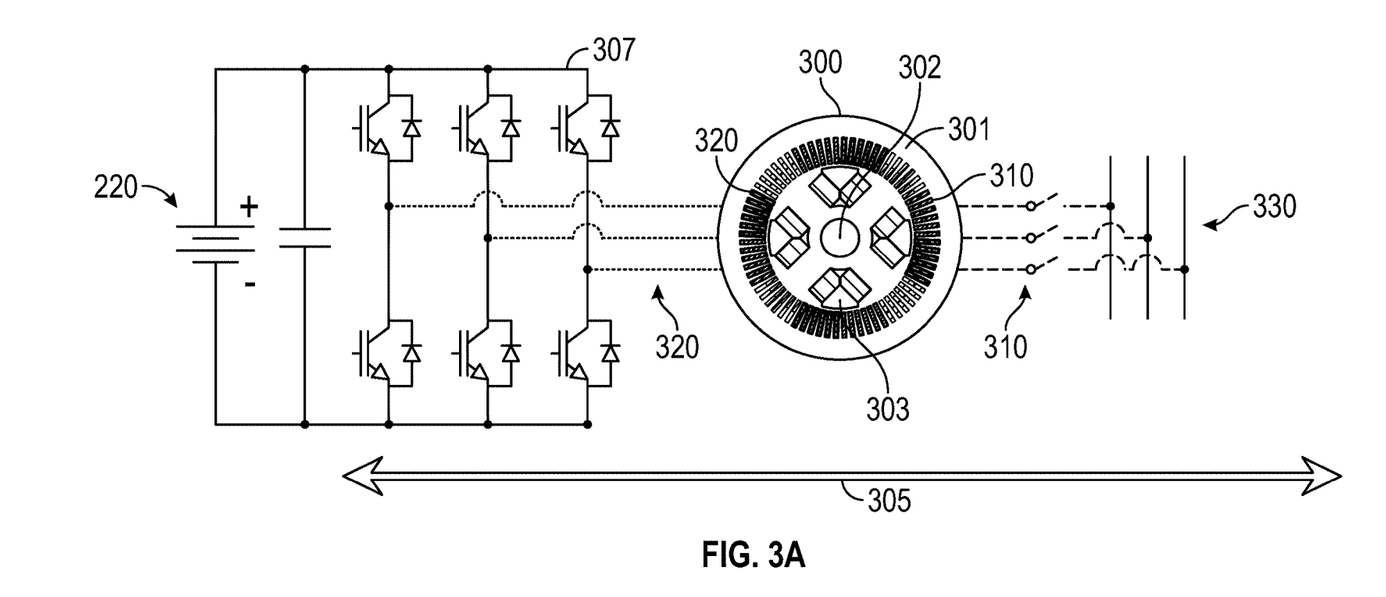
FIG. 3A is a schematic diagram illustrating power flow between windings of an electric motor in accordance with embodiments of the present disclosure.

Referring now to FIG. 3A, a schematic diagram illustrating power flow between windings of an electric motor is illustrated. In this example, electric motor 300 comprises a stator 301 and a rotor 302. In this example, the stator 301 includes a first (primary) set of windings 310, and a second (secondary) set of windings 320 that together make up a three-phase (3-ph) set of windings. The sets of windings 310, 320 are configured to produce an electromagnetic field and the rotor 302 includes one or more magnets 303 that are configured to interact with the electromagnetic field produced by the sets of windings 310, 320. In some embodiments, the rotor may have magnets or a rotor winding. When the rotor winding is excited with current, the rotor becomes an electromagnet.

In the example depicted in FIG. 3A, bidirectional power flow between the primary windings 310 and the secondary windings 320 is illustrated by arrow 305. Typically, electric motors in propulsion mode use closed-loop current control to adjust torque and speed. The windings are energized with controllable energy/power sources, e.g., battery and a voltage source inverter (VSI) with PWM control.

For direct-grid-tie AC power transfer, such as G2V, V2G, etc., a segmented-winding electric motor (such as is illustrated in FIG. 3A) may be used. As shown in FIG. 3A, the secondary set of 3-ph windings 320 is fed by a controllable energy/power source, namely battery 220. The primary set of 3-ph windings 310 is directly fed by the power system, namely a 230-volt (root-mean-square) 3-ph AC power grid 330. In conventional systems, the voltage and current in the primary grid-side windings 310 cannot be controlled directly. As described in more detail below, embodiments of the present disclosure, enhance existing power control methods to achieve simple and robust power transfer control.

Figure 3B:
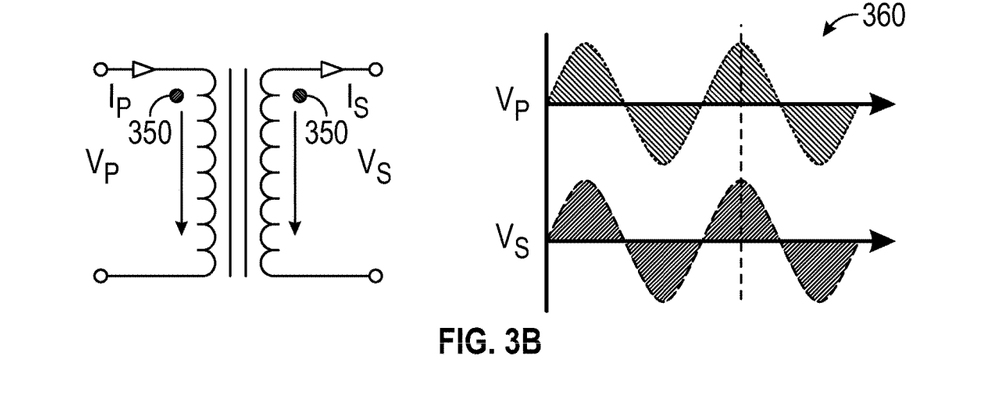
FIG. 3B is a schematic diagram of a transformer and associated voltage waveforms in accordance with embodiments of the present disclosure.

Referring now to FIG. 3B, a schematic diagram of a transformer and associated voltage waveforms is shown. In this example, the dot identifications 350 indicate the phase of the voltages Vp and Vs, which are in-phase in this example. The transformer waveform graph 360 illustrates graphically that Vp and Vs are in-phase with each other, and thus have a zero-degree phase shift.

In the transformer depicted in FIG. 3B, the primary (left) winding is associated with Vp and the secondary (right) winding is associated with Vs. The voltage relationship between the two windings is determined by the turn ratio and load property. Load property means active power P, reactive power Q and power factor cos(y) transferring through the two windings. The turn ratio is known once the transformer is designed.

Applying the relationship between the primary and secondary windings in FIG. 3B to the primary windings 310 and secondary windings 320 in FIG. 3A, the primary winding 310 is connected to the AC power grid 330, so the primary winding voltage (grid voltage) is known by measurement. The voltage of the secondary winding 320, connected to the rechargeable energy storage system (battery 220), is controllable. Embodiments of the invention may be used to manipulate the load properties (P, Q and cos(φ)) by controlling the secondary winding voltage. More specifically, the system may control the secondary winding 320 voltage amplitude and phase angle relative to the primary winding 310 grid voltage in order to control the power flow.

In some embodiments, a dq-axis reference frame may be used for control of the electric motor 300. In particular, the voltage/current vectors are projected onto a d-axis and a q-axis, where the d-axis is the axis along the direction of north polarity of the magnet (or the north polarity of the magnet field generated by the rotor field winding) and the q-axis is the axis perpendicular to the d-axis. The q-axis is 90-degrees ahead of the north polarity of the magnet field. A component (voltage/current) along the d-axis is usually related to building a magnetic field in the electric motor and reactive power (e.g., power unrelated to torque production). A component along the q-axis is usually related to torque production contributing to active power transfer.

The magnitude of a voltage/vector is calculated as $V_{mag} = \sqrt{v_d^2 + v_q^2}$. The phase angle of the voltage vector can be expressed as $\theta = \text{atan}(v_d/v_q)$. As can be seen, when the system controls the amplitude and phase angle of the secondary winding 320 relative to the grid voltage in the primary winding 310, the system is controlling the d-axis voltage ($v_d$) and q-axis voltage ($v_q$) of the primary winding 310.

According to the dq-axis voltage expressions of a dual-3-phase-winding motor (e.g., the segmented-winding motor depicted in FIG. 3A), the relationship between the secondary winding 320 (fed by the inverter system 307 in FIG. 3A) dq-axis voltage and the primary winding 310 (the primary winding 310 connected to the power system 330 in FIG. 3A) dq-axis voltage can be derived, as shown below.

For example, the difference between the $v_{q1}$ and $v_{q2}$ is $\omega_{re} L_{ld}(i_{d1} - i_{d2})$. This difference is a function of rotor electrical speed $\omega_{re}$, d-axis leakage inductance $L_{ld}$, and the difference of d-axis current between the two windings ($i_{d1} - i_{d2}$).

Similarly, the difference between the $v_{d1}$ and $v_{d2}$ is $-\omega_{re} L_{lq}(i_{q1} - i_{q2})$. This difference is a function of rotor electrical speed $\omega_{re}$, q-axis leakage inductance $L_{lq}$, and the difference of q-axis current between the two windings $(i_{q1}-i_{q2})$.

The dq-axis voltage on the grid side may thus be represented as:

$$v_{d1} = -\omega_{re}L_{lq}(i_{q1} - i_{q2}) + v_{d2}$$

$$v_{q1} = \omega_{re}L_{ld}(i_{d1} - i_{d2}) + v_{q2}$$

In the preceding equation, $v_{d1}$ and $v_{q1}$ are the d-axis voltage and q-axis voltage, respectively, on the grid side. They are uncontrollable but measurable. The system can measure the rotor electrical speed $\omega_{re}$, as well as leakage inductance $L_{ld}$ and $L_{lq}$. The current in both windings 310, 320 are also available. So $(i_{d1}-i_{d2})$ and $(i_{q1}-i_{q2})$ are also known. The system can use this information to calculate the voltages of the secondary winding 320 as $v_{d2}$ and $v_{q2}$. They also reflect the output voltage from inverter system 307.

As mentioned previously, the d-axis component is related to reactive power, and the q-axis component is related to active power. To control the power flow, (that is, the active and reactive power), the system can control the secondary winding 320 voltages $v_{d2}$ and $v_{q2}$ given the measured primary winding voltages $v_{d1}$ and $v_{q1}$ so that the d-axis component $(i_{d1}-i_{d2})$ can be controlled to change reactive power flow, and $(i_{q1}-i_{q2})$ can be controlled to change active power flow.

Figure 4:
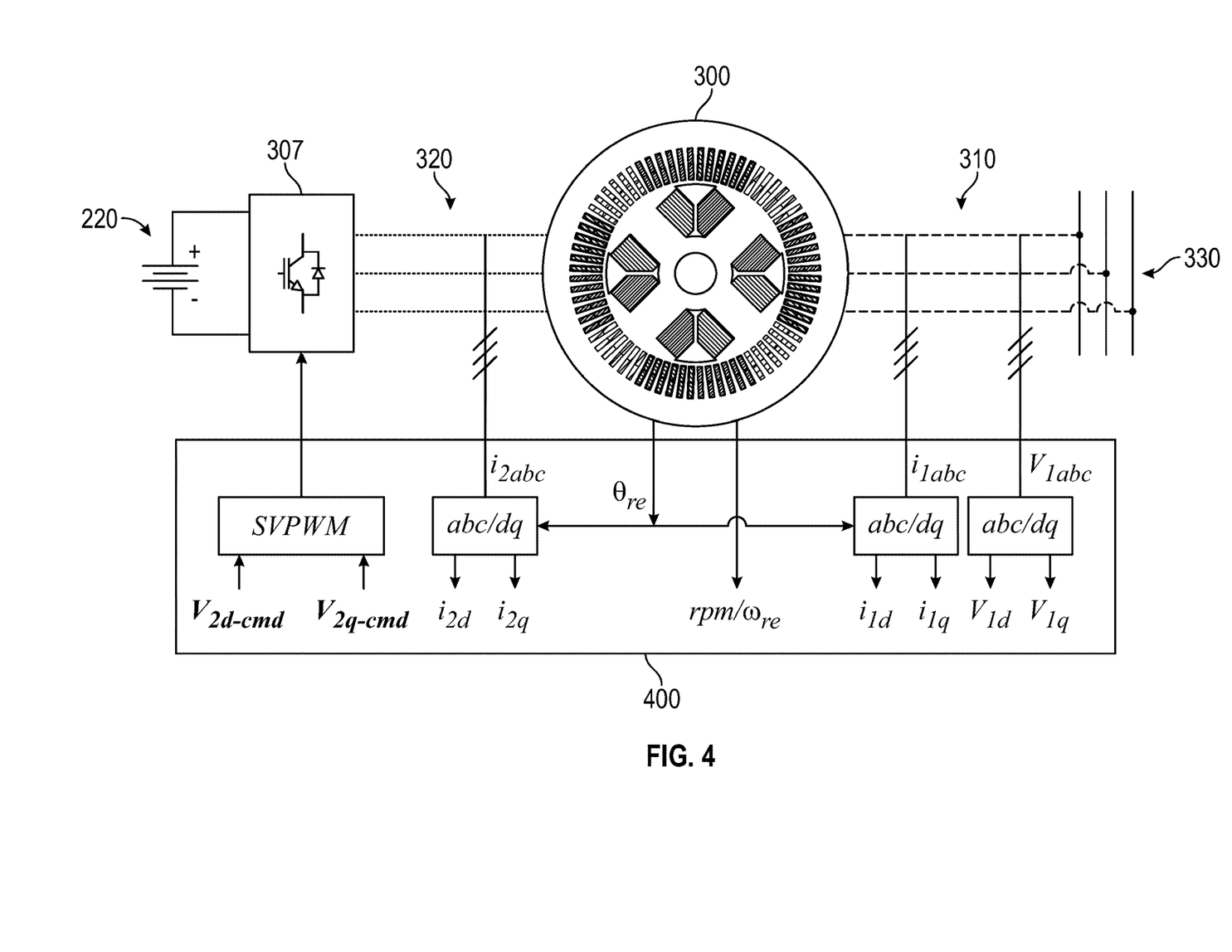
FIG. 4 is a schematic diagram of a control system coupled to an electric motor in accordance with various embodiments.

Referring now to FIG. 4, a schematic diagram of a control system coupled to an electric motor in accordance with various embodiments is shown. In this example, control system 400 is coupled to the electric motor 300 to control the operation of the electric motor 300, via gate control signals provided to the inverter system 307, using measurements received from the components of the electric motor 300.

In some exemplary embodiments, the control system 400 includes at least one processor, such as a general processor, a central processing unit, an application-specific integrated circuit (ASIC), a digital signal processor, a field-programmable gate array (FPGA), a digital circuit, an analog circuit, or combinations thereof. In some embodiments, the control system 400 includes a memory in communication with the processor to store data and instructions executable by the processor to retrieve measurements from the electric motor 300 and control the electric motor (e.g., via gate control signals sent to the inverter system 307).

The control system 400 may measure the three-phase voltage of the primary winding 310, $v_{1abc}$, and three-phase currents of both the primary winding 310 and secondary windings 320, $i_{1abc}$ and $i_{2abc}$. The control system 400 may further measure the rotor electrical position $\theta_{re}$ to calculate the rotor electrical speed $\omega_{re}$, and for park transformation (that is, converting three-phase components to dq-axis components).

Figure 5A:
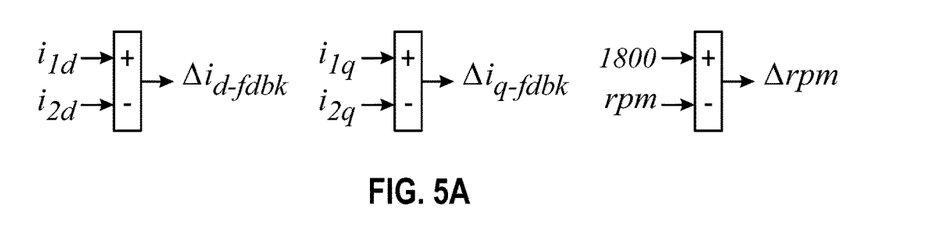
FIG. 5A, FIG. 5B, and FIG. 5C include diagrams illustrating logic performed by the control system depicted in FIG. 4 in accordance with embodiments of the present disclosure.
Figure 5B:
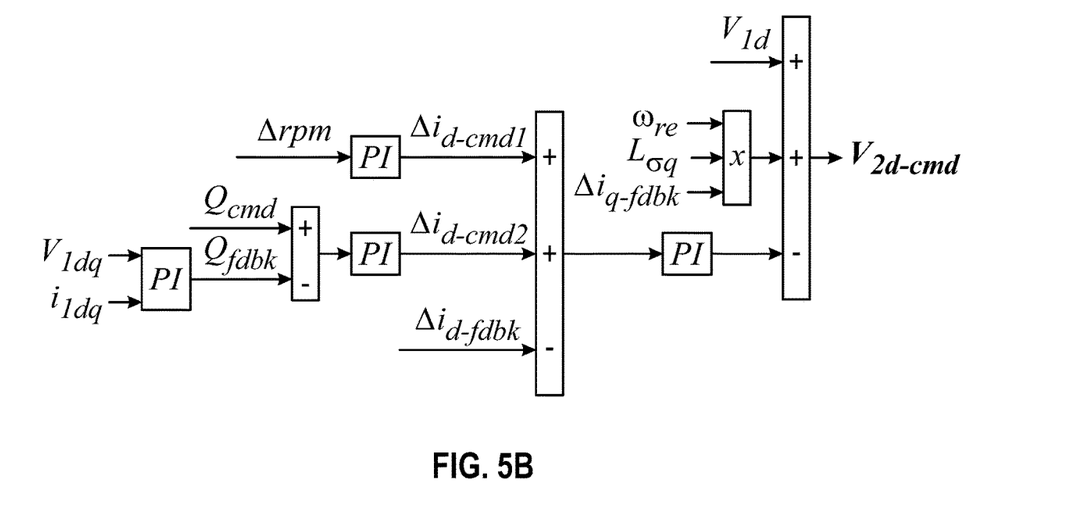
Figure 5C:
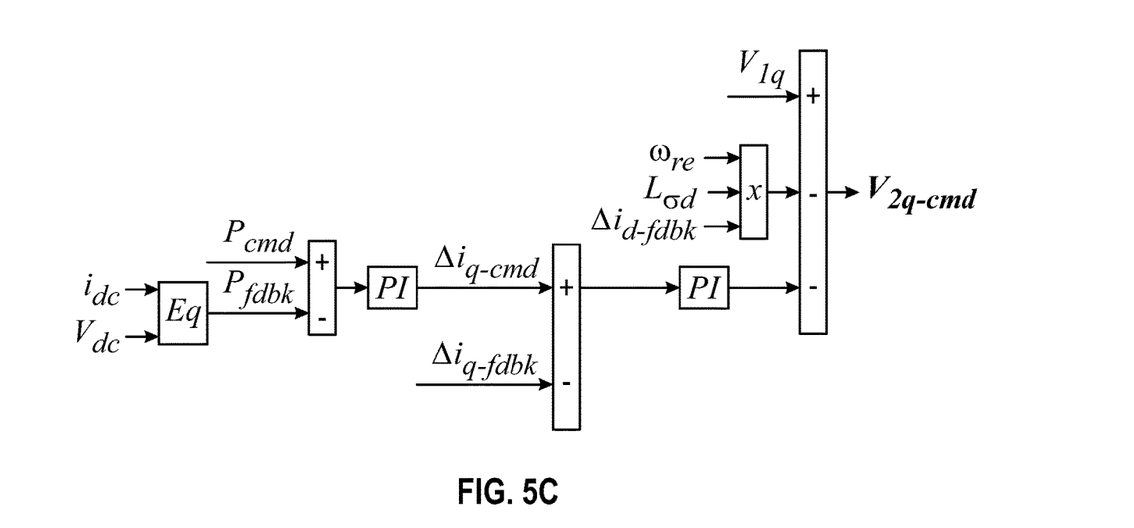

Referring now to FIG. 5A, FIG. 5B, and FIG. 5C, diagrams illustrating logic performed by the control system 400 are illustrated. In FIG. 5A, the current difference between the primary winding 310 and secondary winding 320 is calculated. In this example, 1800 rpm is the 60-Hz synchronous speed of a 4-pole motor, which spins at a speed synchronous with the grid voltage. Embodiments of the present invention may operate with any other suitable electric motor configurations. For example, for a 6-pole motor, the 60-Hz synchronous speed is 1200 rpm; and for an 8-pole motor, the 60-Hz synchronous speed is 900 rpm. Embodiments of the present invention may also operate in conjunction with different synchronous speeds (e.g., 50 Hz), in which case the synchronous speed changes accordingly. In the example shown in FIG. 5A, the difference between the command 1800-rpm speed and the measured motor speed rpm is the speed difference Δrpm.

In FIG. 5B, the control system 400 determines the d-axis command voltage, V2d-cmd. In this example, the control system 400 determines a desired $v_{d2}$ based on $v_{d1}$, the rotor electrical speed, leakage inductance and the q-axis current difference. Additionally, the control system 400 may add an extra voltage control target to control the reactive power. This target will be the output of the proportional integral (PI) controller blocks shown in FIG. 5B.

In some embodiments, the control system may measure the difference between the command d-axis current and the feedback d-axis current, then send the difference through a PI controller to obtain the command or say reference d-axis voltage. The control system 400 may determine the command d-axis current Δidcmd2, which is the output of a PI controller where the input to the PI controller is the reactive power difference $Q_{cmd}-Q_{fdbk}$. As can be seen, the reactive power is directly related to d-axis current. The control system 400 determines the feedback reactive power $Q_{fdbk}$ using measured dq-axis voltage and current based on the reactive power equation of the motor.

As shown in FIG. 5C, the control system 400 determines $v_{2qcmd}$ using all the q-axis components. In this example, the difference between command active power and feedback active power $P_{cmd}-P_{fdbk}$ goes through a PI controller to generated q-axis current command. The feedback active power $P_{fdbk}$ is determined based on the dc current and dc voltage. In exemplary embodiments, the electric motor speed needs to be controlled to synchronize the motor with the grid frequency. The electric motor speed is a result of torque, and torque is generated based on current. Accordingly, the control system may send the speed difference Δrpm through a PI controller to generate an appropriate current command.

In some embodiments, the control system 400 may not necessarily determine the speed controller using the d-axis vector, depending on the type of the electric motor. For example, an electric motor that has reluctance torque is related to d-axis current, therefore the speed controller can be placed on the d-axis to generate $\Delta i_{dcmd}$. However, if the electric motor doesn't have reluctance torque, the control system may determine the speed controller using the q-axis vector.

Referring back to FIG. 4, the resulting dq-axis voltage command values determined in FIG. 5A, FIG. 5B, and FIG. 5C ($v_{2dcmd}$ and $v_{2qcmd}$) may be used by the control system 400 to determine gate signals to control the inverter system 307. As shown in FIG. 4, the dq-axis voltage commands are sent to a PWM generation process. In this example, the PWM generation process is a space vector pulse width modulation (SVPWM) process, though other PWM processes may be used in alternate embodiments.

In the PWM process, the dq-axis voltages are first converted to a three-phase abc-reference voltage using inverse part transformation. The three-phase reference voltage is next compared with a carrier waveform (e.g., triangle or sawtooth carrier, etc.) to generate on and off gate signals for the inverter system 307.

Figure 6A:
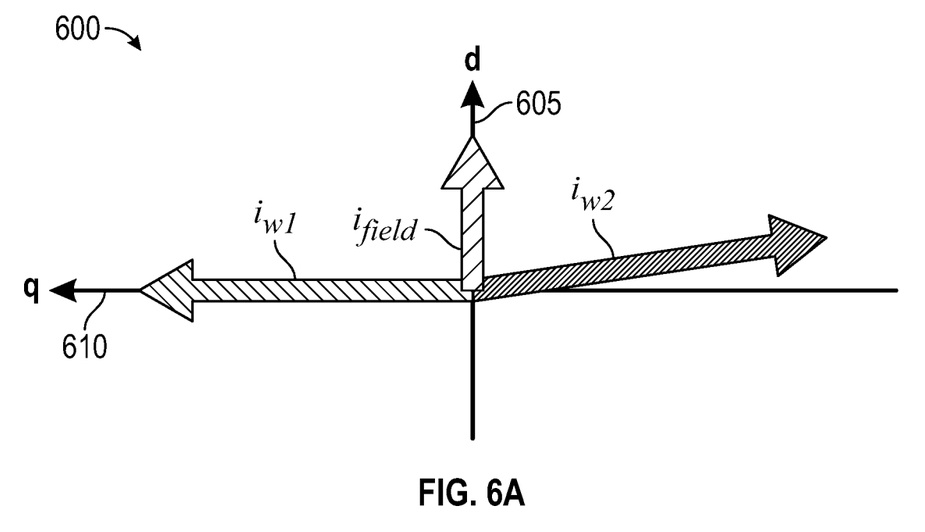
FIG. 6A illustrates an example of a diagram of dq-axis vectors for a G2V application in accordance with one or more embodiments of the present disclosure.
Figure 6B:
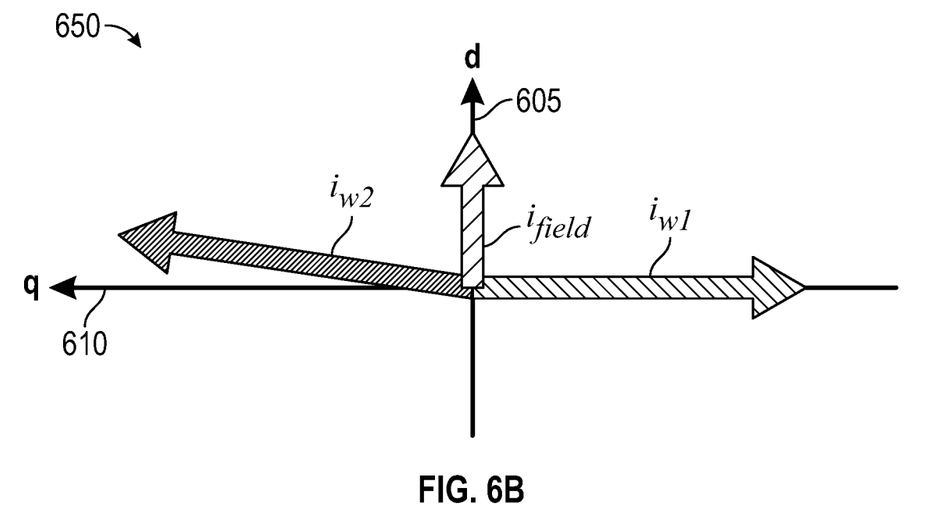
FIG. 6B illustrates an example of a diagram of dq-axis vectors for a V2G application in accordance with one or more embodiments of the present disclosure.

Referring now to FIG. 6A and FIG. 6B, examples of diagrams of dq-axis vectors for a G2V application and V2G application, respectively, with d-axis current 605 and q-axis current 610 as shown. In the example of the G2V application graph 600 shown in FIG. 6A, the primary winding 310 current $i_{w1}$ has a positive iq and consumes power from the grid 330. The secondary winding 320 has a negative iq and delivers power to the battery 220.

In the example of the V2G application graph 650 shown in FIG. 6B, primary winding 310 current $i_{w1}$ has a negative iq and delivers power to the grid 330. The secondary winding 320 has a positive iq and consumes power from the battery 220. In FIG. 6A and FIG. 6B, a field winding may be needed if it is an electrically excited synchronous machine. The magnitude of $i_{field}$ may vary depending on the machine design and power need.

As described previously, embodiments of the present invention provide direct voltage control for direct-grid tie power transfer using a segmented-winding electric motor. In particular, the control system 400 directly generates command voltages $v_{d2}$ and $v_{q2}$ without specifying how a large a d-axis and q-axis current is needed. This is a significant enhancement compared with current control methods, where the magnitude of d-axis and q-axis currents are specified and controlled.

Although the control system 400 doesn't specify the d-axis and q-axis current in the control signals, the resultant current vectors may be reflected in the vector relationships illustrated in FIG. 6A and FIG. 6B.

For example, in the G2V scenario shown in FIG. 6A, the primary winding 310 current vector $i_{w1}$ is automatically placed on the q-axis current with direct voltage control. As introduced above, the q-axis component is related to active power, and iwi is completely on the positive q-axis in this example. Accordingly, the secondary winding 320 consumes active power from external grid to function like a motor.

In some embodiments, a unity power factor is required in the primary winding 310 to help a user avoid a penalty associated with a low power factor. Accordingly, in some embodiments the primary winding current $i_{w1}$ should preferably only have a q-axis component and no d-axis component. Alternatively, the control system 400 controls the electric motor 300 to consume or deliver reactive from or to the power grid, the primary winding 310 may have a positive or negative d-axis component (note the d-axis current component is related to reactive power).

Similarly, in FIG. 6A the secondary winding current $i_{w2}$ is placed on the negative q axis and it has negative $i_q$ current. Negative q-axis current makes secondary winding 320 function as a generator to deliver power to the battery 220. The secondary winding 320 current doesn't necessarily have q-axis current only. Instead, the secondary winding 320 current may have a d-axis component, either positive or negative. The control system 400 may control the secondary winding d-axis current to manipulate the magnetic field inside the electric motor 300 so that the primary winding 310 current is always placed on the q-axis current, thereby guaranteeing a unity power factor on the grid side.

In FIGS. 6A and 6B, the field winding current $i_{field}$ is a current vector existing only in wound field synchronous machine. In some embodiments, the field winding is wound on the rotor forming an electromagnetic field. Changing its current will change the magnitude of the rotor magnetic field. This rotor magnetic field is required to generate torque if it is a motor, or to build up field for power transfer in some embodiments. In a permanent magnet synchronous machine, by contrast, magnets are mounted on the rotor to build up the field. Accordingly, a permanent magnet machine doesn't have a field winding current vector.

In some embodiments, the magnitude of the field winding current may be tuned for direct-grid-tied power transfer. A stronger field winding current allows a stronger field, larger magnetic flux, higher back emf in the winding and therefore more power to be transferred.

Field winding current also has the same function as the d-axis current in the two windings. Increasing the field winding current will build up more reactive power in the motor and allows a lower d-axis current in both windings. For example, if the primary winding 310 has a positive d-axis current causing a low power factor, the system can either increase secondary winding 320 d-axis current or increase field winding current to build up more field/reactive power in the motor in order to lower the d-axis primary winding current.

For vehicle-to-grid scenarios, the control system 400 may reverse the primary winding 310 and secondary winding 320 current vectors in terms of their q-axis components. As a result, primary winding 310 functions as a generator delivering power to the power grid 330. Secondary winding 320 functions as a motor consuming power from the battery 220. Therefore, power is delivered from the onboard battery pack to the external sources or loads. Vehicle-to-load scenario has the same current vector relationship.

Referring now to FIGS. 7A-7H, graphs illustrating aspects of G2V and V2G scenarios in accordance with various aspects of the present invention are shown. Each graph is depicted with reference to three phases of operation by the control system 400, namely speed ramping 702, voltage synchronization 704, and power transfer 706.

Figure 7A:
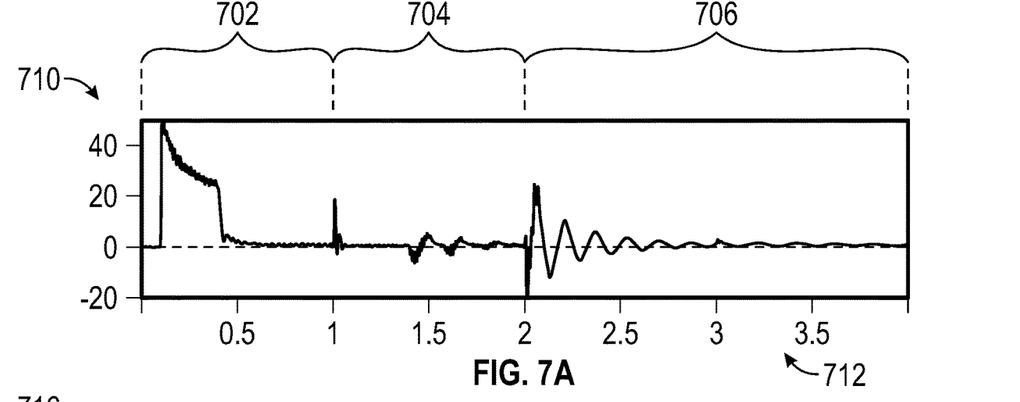
FIGS. 7A-7H include graphs illustrating aspects of G2V and V2G scenarios in accordance with various aspects of the present invention.
Figure 7B:
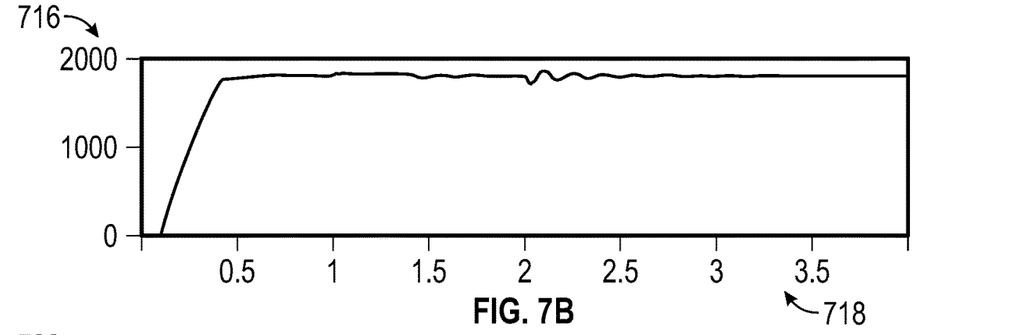

During speed ramping 702, the secondary winding 320 is disconnected from the power grid 330. Primary winding 310 current is controlled by the inverter to create torque as shown in FIG. 7A, which shows torque 710 over time 712. FIG. 7B shows speed 716 over time 718.

Figure 7C:
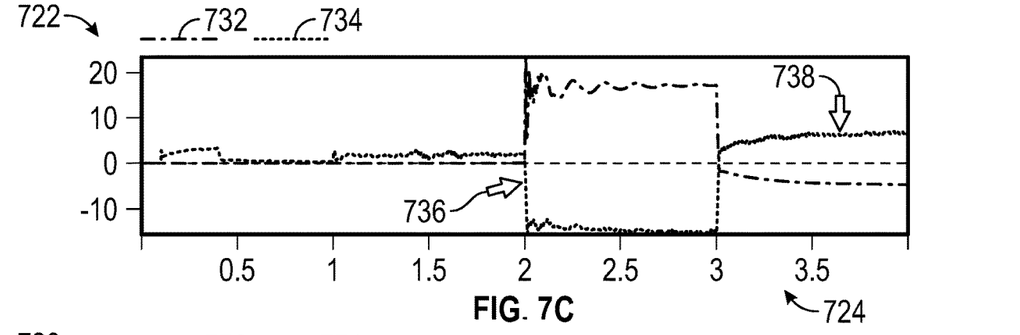

FIG. 7C shows active power 722 over time 724. In this example, the power of winding 1 is shown via graph line 732, and the power of winding 2 is shown via graph line 734. At 736 in the graph, the active power is 15-kW (e.g., a G2V scenario), while at 738 the active power is 5-kW (e.g., a V2G scenario).

Figure 7D:
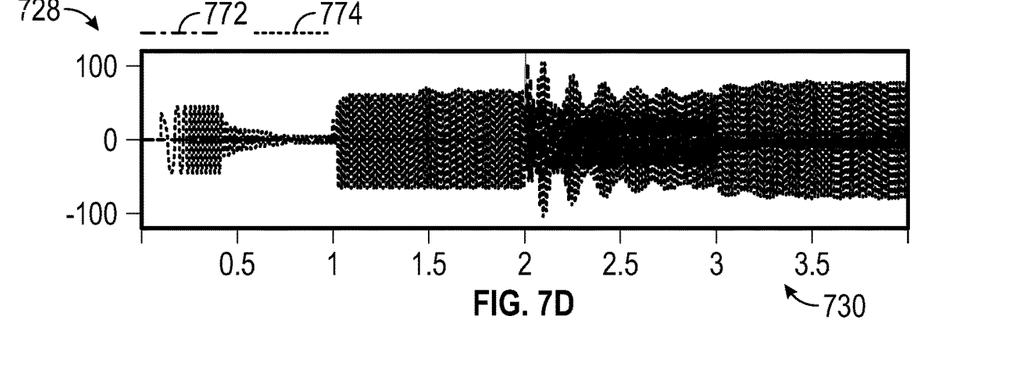

FIG. 7D shows current (phase-A) 728 over time 730. In this example, the current of winding 1 is shown via graph line 772 and the current of winding 2 is shown via graph line 774.

Figure 7E:
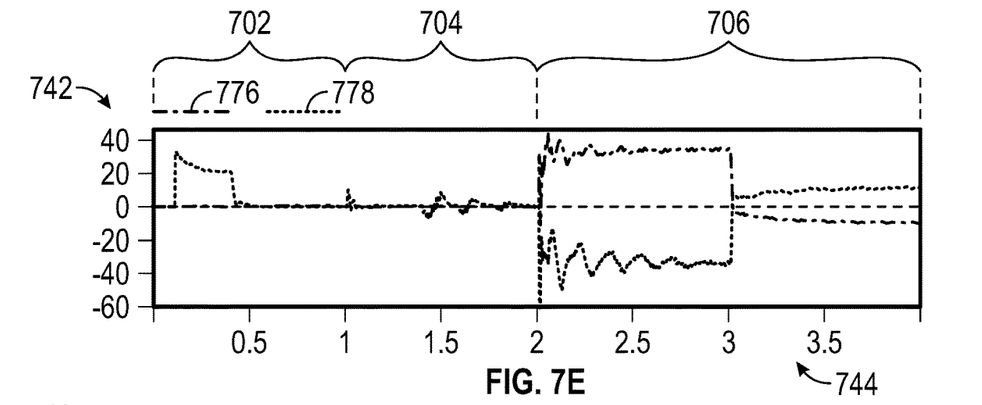

FIG. 7E shows current (q-axis current) 742 over time 744. The q-axis current of winding 1 is shown via graph line 776 and the q-axis current of winding 2 is shown via graph line 778. As illustrated in this graph, primary winding 310 has a positive q-axis current as shown by the curve of graph line 778. in FIG. 7E. As a result, the motor speed increases until it reaches 1800 rpm (that is, the 60-Hz synchronous speed of a 4-pole motor as shown in FIG. 7B).

The torque is mainly around 0 Nm during voltage synchronization stage 704 and power transfer stage 706 because relatively little positive torque is needed to maintain the 1800 rpm synchronous speed. During the voltage synchronization stage 704, the electric motor 300 is mechanically decoupled from the axle otherwise the vehicle will move.

During the voltage synchronization stage 704, primary winding 310 is still disconnected from the grid 330. Secondary winding 320 has a negative active power (mainly copper loss, i.e., $P=i^2r$) shown by the winding 2 graph line 734 in FIG. 7C. The primary winding 310 current is zero because primary winding 310 is an open circuit.

Figure 7F:
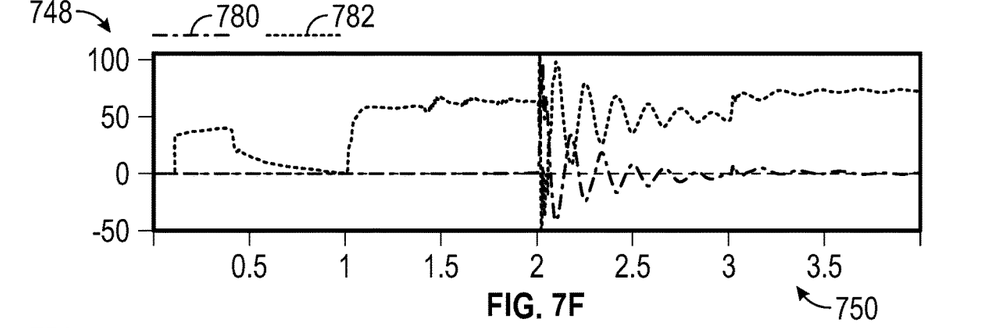

FIG. 7F shows d-axis current 748 over time 750. The d-axis current of winding 1 is shown via graph line 780 and the d-axis current of winding 2 is shown via graph line 782. Primary winding 310 current uses a high d-axis current as illustrated by the graph line 782 in FIG. 7F to boost the flux of the motor so that the secondary winding 320 back emf can be kept at a level as high as the grid voltage. In some embodiments, at the voltage synchronization stage 704, the secondary winding 320 back emf has the same voltage magnitude, frequency, and phase angle as the grid voltage.

In power transfer stage 706, FIGS. 7A-7H illustrate a G2V scenario (between seconds 2 and 3 on each graph) and a V2G scenario (between seconds 3 and 4 on each graph). During the G2V scenario, the primary winding 310 has positive active power consuming grid power. The secondary winding 320 has negative active power delivering the grid power to the battery 220. During V2G, the polarity of active power is swapped. Power goes from battery 220 to the grid 330.

During G2V, the primary winding 310 has positive iq, and the secondary winding 320 has negative iq as shown in FIG. 7E, which are symmetric about the x-axis. In addition, the secondary winding 320 has a positive id in order to intensify the magnetic field inside the motor and contribute reactive power. Consequently, winding 1 d-axis current is kept at OA as shown in FIG. 7F.

Figure 7G:
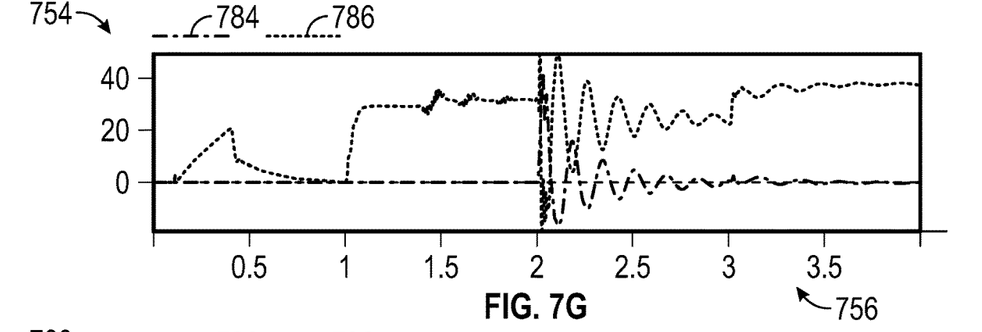
Figure 7H:
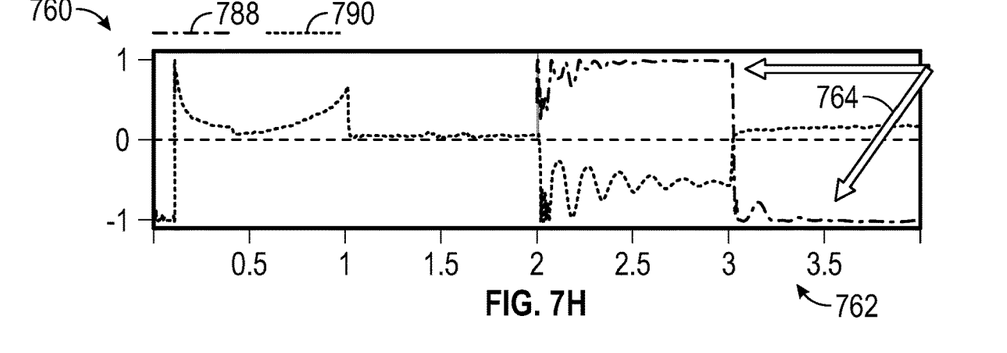

Therefore, during G2V, the primary winding 310 reactive power is zero in FIG. 7G and the primary winding 310 power factor is kept at 1 (unity power factor 764) in FIG. 7H due to the OA primary winding 310 d-axis current in FIG. 7F.

FIG. 7G shows reactive power 754 over time 756. The reactive power of winding 1 is shown by graph line 784 and the reactive power of winding 2 is shown by graph line 786. FIG. 7H shows power factor 760 over time 762. The power factor of winding 1 is shown by graph line 788 and the power factor of winding 2 is shown by graph line 790.

The secondary winding 320 d-axis current is not 0 A during the power transfer stage 706 as shown in FIG. 7F. The secondary winding 320 reactive power is not zero in FIG. 7G. As a result, the secondary winding 320 power factor is only around −0.5 as shown by graph line 790 in FIG. 7H. During V2G, the primary winding 310 can still keep its power factor at −1 as shown by graph line 788 in FIG. 7H.

Figure 8:
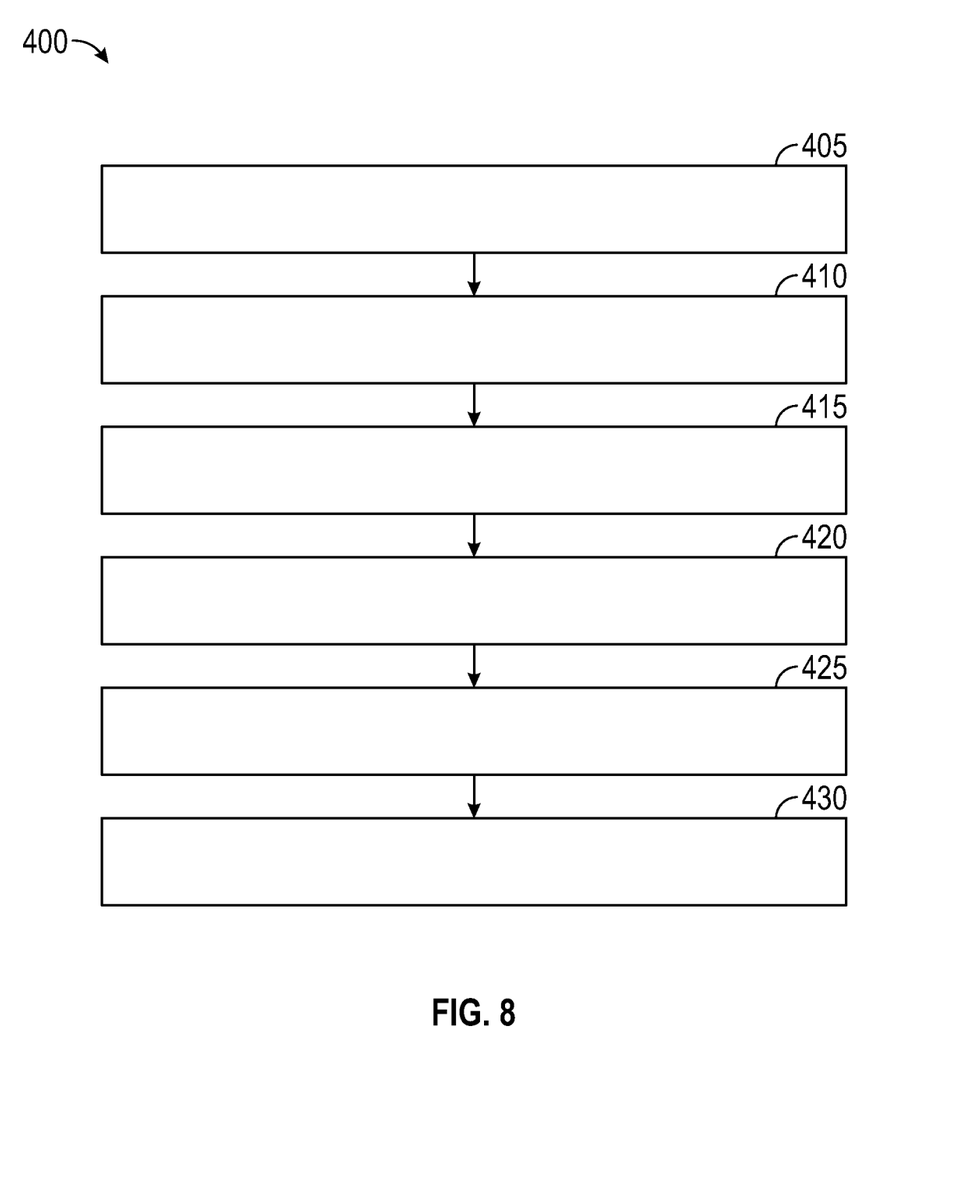
FIG. 8 is a flow diagram illustrating a process in accordance with various aspects of the present invention.

Referring now to FIG. 8, an example of a process that may be performed in accordance with various embodiments is shown. The process 800 in FIG. 8 may be performed by any suitable device or combination of devices, such as by a processor of control system 400 executing computer-readable instructions stored in a memory of the control system 400.

In this example, process 800 includes, at 805, receiving a voltage and a current from a primary winding of the electric motor. The process further includes, at 810, receiving a current from a secondary winding of the electric motor. In some embodiments, the electric motor comprises a segmented-winding machine. The segmented winding machine may be a permanent magnet synchronous machine, a synchronous reluctance machine, or a wound field synchronous machine. In some embodiments, the segmented winding machine comprises the secondary winding (e.g., winding 320) coupled to a rechargeable energy storage system (e.g., battery 220 via inverter system 307) and the primary winding (e.g., winding 310) coupled to an external power source (e.g., power source 330).

The process 800 further includes, at 815, receiving a rotor electrical position from a rotor of the electric motor and, at 820, determining a d-axis command voltage for the secondary winding and a q-axis command voltage for the secondary winding based on the primary winding voltage, the primary winding current, the secondary winding current, and the rotor electrical position.

The process 800 further includes, at 825, generating gate control signals based on the determined d-axis command voltage and q-axis command voltage for the secondary winding. The process further includes, at 830, transmitting the gate control signals to an inverter coupled to the secondary winding to control an electrical power transfer between the primary winding and the secondary winding.

In some embodiments, the voltage from the primary winding is a three-phase voltage, the current from the primary winding is a three-phase current, and the current from the secondary winding is a three-phase current.

In some embodiments, the d-axis command voltage is associated with a d-axis along a direction of a north polarity of a magnet or a north polarity of a magnet field generated by a rotor field winding. The d-axis command voltage may be associated with reactive power transfer of the electric motor.

In some embodiments, the q-axis command voltage is associated with a q-axis that is perpendicular to the d-axis, wherein the q-axis is ninety degrees ahead of the north polarity associated with the d-axis. The control q-axis command voltage may be associated with active power transfer in the electric motor.

In some embodiments, determining the d-axis command voltage for the secondary winding and the q-axis command voltage for the secondary winding is further based on a d-axis leakage inductance and a q-axis leakage inductance measured from the electric motor.

In some embodiments, the gate control signals are to turn the electric motor at a speed synchronous with a grid voltage associated with the electric motor. In some cases, the speed synchronous with the grid voltage is further based on a grid frequency and a number of magnetic poles associated with the electric motor. In other cases, the speed synchronous with the grid voltage is based on a determined amount of torque. In some embodiments, the electric motor has reluctance torque, and the d-axis command voltage is determined based on a d-axis current associated with the determined amount of torque. In other embodiments, the electric motor does not have reluctance torque, and the q-axis command voltage is determined based on a q-axis current associated with the determined amount of torque.

In some embodiments, the d-axis command voltage for the secondary winding and a q-axis command voltage for the secondary winding are determined based on a desired torque to achieve a speed synchronous with the grid voltage associated with the electric motor.

In some embodiments, the gate control signals are generated by applying a pulse width modulation (PWM) process to the determined d-axis command voltage and q-axis command voltage for the secondary winding. For example, in some embodiments the PWM process is a space vector pulse width modulation (SVPWM) process.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A control system coupled to an electric motor, the control system comprising:
   a processor; and
   memory coupled to the processor and storing instructions that, when executed by the processor, cause the control system to:
      receive a voltage and a current from a primary winding of the electric motor;
      receive a current from a secondary winding of the electric motor;
      receive a rotor electrical position from a rotor of the electric motor;
      determine a d-axis command voltage for the secondary winding and a q-axis command voltage for the secondary winding based on the primary winding voltage, the primary winding current, the secondary winding current, and the rotor electrical position;
      generate gate control signals based on the determined d-axis command voltage and q-axis command voltage for the secondary winding; and
      transmit the gate control signals to an inverter coupled to the secondary winding to control an electrical power transfer between the primary winding and the secondary winding.

2. The control system of claim 1, wherein the voltage from the primary winding is a three-phase voltage, the current from the primary winding is a three-phase current, and the current from the secondary winding is a three-phase current.

3. The control system of claim 1, wherein the electric motor comprises a segmented winding machine.

4. The control system of claim 3, wherein the segmented winding machine is a permanent magnet synchronous machine, a synchronous reluctance machine, or a wound field synchronous machine.

5. The control system of claim 3, wherein the segmented winding machine comprises the secondary winding coupled to a rechargeable energy storage system and the primary winding coupled to an external power source.

6. The control system of claim 1, wherein the d-axis command voltage is associated with a d-axis along a direction of a north polarity of a magnet or a north polarity of a magnet field generated by a rotor field winding.

7. The control system of claim 6, wherein the d-axis command voltage is associated with reactive power transfer of the electric motor.

8. The control system of claim 1, wherein the q-axis command voltage is associated with a q-axis that is perpendicular to the d-axis, wherein the q-axis is ninety degrees ahead of a north polarity associated with the d-axis.

9. The control system of claim 8, wherein the q-axis command voltage is associated with active power transfer in the electric motor.

10. The control system of claim 1, wherein determining the d-axis command voltage for the secondary winding and the q-axis command voltage for the secondary winding is further based on a d-axis leakage inductance and a q-axis leakage inductance measured from the electric motor.

11. The control system of claim 1, wherein the gate control signals are to turn the electric motor at a speed synchronous with a grid voltage associated with the electric motor.

12. The control system of claim 11, wherein the speed synchronous with the grid voltage is further based on a grid frequency and a number of magnetic poles associated with the electric motor.

13. The control system of claim 11, wherein the speed synchronous with the grid voltage is based on a determined amount of torque.

14. The control system of claim 13, wherein the electric motor has reluctance torque, and the d-axis command voltage is determined based on a d-axis current associated with the determined amount of torque.

15. The control system of claim 13, wherein the electric motor does not have reluctance torque, and the q-axis command voltage is determined based on a q-axis current associated with the determined amount of torque.

16. The control system of claim 1, wherein the d-axis command voltage for the secondary winding and a q-axis command voltage for the secondary winding are determined based on a desired torque to achieve a speed synchronous with a grid voltage associated with the electric motor.

17. The control system of claim 1, wherein the gate control signals are generated by applying a pulse width modulation (PWM) process to the determined d-axis command voltage and q-axis command voltage for the secondary winding.

18. The control system of claim 17, wherein the PWM process is a space vector pulse width modulation (SVPWM) process.

19. An electric motor, comprising:
   a rotor;
   a stator;
   a primary winding coupled to the stator;
   a secondary winding coupled to the stator;
   an inverter coupled to the primary winding; and
   a control system coupled to the rotor, primary winding, secondary winding, and inverter, the control system comprising:
      a processor; and
      memory coupled to the processor and storing instructions that, when executed by the processor, cause the control system to:
         receive a voltage and a current from the primary winding of the electric motor;

receive a current from the secondary winding of the electric motor;

receive a rotor electrical position from the rotor of the electric motor;

determine a d-axis command voltage for the secondary winding and a q-axis command voltage for the secondary winding based on the primary winding voltage, the primary winding current, the secondary winding current, and the rotor electrical position;

generate gate control signals based on the determined d-axis command voltage and q-axis command voltage for the secondary winding; and transmit the gate control signals to the inverter coupled to the secondary winding to control an electrical power transfer between the primary winding and the secondary winding.

20. A vehicle comprising:

an electric motor, that includes:

a rotor;

a stator;

a primary winding coupled to the stator;

a secondary winding coupled to the stator;

an inverter coupled to the secondary winding; and a control system coupled to electric motor, the control system comprising:

a processor; and memory coupled to the processor and storing instructions that, when executed by the processor, cause the control system to:

receive a voltage and a current from the primary winding of the electric motor;

receive a current from the secondary winding of the electric motor;

receive a rotor electrical position from the rotor of the electric motor;

determine a d-axis command voltage for the secondary winding and a q-axis command voltage for the secondary winding based on the primary winding voltage, the primary winding current, the secondary winding current, and the rotor electrical position;

generate gate control signals based on the determined d-axis command voltage and q-axis command voltage for the secondary winding; and transmit the gate control signals to the inverter coupled to the secondary winding to control an electrical power transfer between the primary winding and the secondary winding.

\* \* \* \* \*